(12) United States Patent
Lee

(10) Patent No.: US 8,835,600 B2
(45) Date of Patent: Sep. 16, 2014

(54) PROCESS OF FORMING AN ARAMID COPOLYMER

(75) Inventor: Kiu-Seung Lee, Midlothian, VA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 227 days.

(21) Appl. No.: 13/559,674

(22) Filed: Jul. 27, 2012

(65) Prior Publication Data

US 2013/0197146 A1   Aug. 1, 2013

Related U.S. Application Data

(60) Provisional application No. 61/513,031, filed on Jul. 29, 2011, provisional application No. 61/513,028, filed on Jul. 29, 2011.

(51) Int. Cl.
| | | |
|---|---|---|
| C08G 73/00 | (2006.01) | |
| C08G 73/18 | (2006.01) | |
| C08G 69/06 | (2006.01) | |
| C08G 69/00 | (2006.01) | |
| C08G 69/32 | (2006.01) | |

(52) U.S. Cl.
CPC .............. C08G 69/00 (2013.01); C08G 73/18 (2013.01); C08G 69/06 (2013.01); C08G 69/32 (2013.01)
USPC ........................................ 528/422; 528/371

(58) Field of Classification Search
USPC .......................................... 524/422; 528/371
See application file for complete search history.

(56) References Cited

U.S. PATENT DOCUMENTS

| | | | |
|---|---|---|---|
| 3,063,966 A | 11/1962 | Du Pont | |
| 3,227,793 A | 1/1966 | Cipriani | |
| 3,414,645 A | 12/1968 | Morgan | |
| 3,600,350 A | 8/1971 | Kwolek | |
| 3,767,756 A | 10/1973 | Blades | |
| 4,018,735 A | 4/1977 | Nakagawa et al. | |
| 4,172,938 A | 10/1979 | Mera | |
| 4,172,983 A | 10/1979 | MacLennan | |
| 5,233,004 A | 8/1993 | Dembek et al. | |
| 5,474,842 A | 12/1995 | Hoiness | |
| 5,571,891 A | 11/1996 | Jung et al. | |
| 5,646,234 A | 7/1997 | Jung et al. | |
| 5,667,743 A | 9/1997 | Tai et al. | |
| 5,811,042 A | 9/1998 | Hoiness | |

(Continued)

FOREIGN PATENT DOCUMENTS

| | | |
|---|---|---|
| CN | 101165078 | 4/2008 |
| CN | 101787582 | 7/2010 |

(Continued)

OTHER PUBLICATIONS

U.S. Appl. No. 13/559,698, Jul. 27, 2012, DuPont.

(Continued)

*Primary Examiner* — Shane Fang

(57) ABSTRACT

The invention concerns processes for forming a polymer comprising residues of 2-(4-amino phenyl)-5 (6) amino phenyl benzimidazole (DAPBI), paraphenylene diamine, and terephthaloyl dichloride, comprising the steps of: a) forming a solution of DAPBI and paraphenylene diamine dihydrochloride in a solvent system comprising an organic solvent and an inorganic salt; b) cooling the solution to a temperature of 30° C. or less; c) adding a stoichiometric amount of terephthaloyl dichloride, relative to the total amount of the DAPBI and the paraphenylene diamine dihydrochloride, to the solution; and d) agitating the solution of step c) to form a polymer.

18 Claims, 1 Drawing Sheet

(56) References Cited

U.S. PATENT DOCUMENTS

| | | |
|---|---|---|
| 2003/0064316 A1 | 4/2003 | Zebala |
| 2010/0029159 A1 | 2/2010 | Ishihara |
| 2011/0046340 A1 | 2/2011 | DeVos et al. |

FOREIGN PATENT DOCUMENTS

| | | |
|---|---|---|
| RU | 2017866 | 8/1994 |
| RU | 2045586 | 10/1995 |
| RU | 2285760 | 10/2006 |
| RU | 2285761 | 10/2006 |
| WO | WO2005/054337 | 6/2005 |
| WO | WO 2005054337 | 6/2005 |
| WO | WO2008105547 | 9/2008 |

OTHER PUBLICATIONS

U.S. Appl. No. 13/559,696, Jul. 27, 2012, DuPont.
U.S. Appl. No. 13/559,691, Jul. 27, 2012, DuPont.
U.S. Appl. No. 13/559,678, Jul. 27, 2012, DuPont.
U.S. Appl. No. 13/559,684, Jul. 27, 2012, DuPont.
U.S. Appl. No. 13/559,681, Jul. 27, 2012, DuPont.
U.S. Appl. No. 13/559,669, Jul. 27, 2012, DuPont.
U.S. Appl. No. 13/559,667, Jul. 27, 2012, DuPont.
U.S. Appl. No. 13/559,661, Jul. 27, 2012, DuPont.
U.S. Appl. No. 13/559,659, Jul. 27, 2012, DuPont.
U.S. Appl. No. 13/559,657, Jul. 27, 2012, DuPont.
U.S. Appl. No. 13/559,655, Jul. 27, 2012, DuPont.
PCT International Search Report and Written opinion for International Application No. PCT/US2012/048428 Dated Oct. 15, 2012.
PCT International Search Report and Written opinion for International Application No. PCT/US2012/048429 Dated Sep. 28, 2012.
PCT International Search Report and Written opinion for International Application No. PCT/US2012/048448 Dated Sep. 27, 2012.
PCT International Search Report and Written opinion for International Application No. PCT/US2012/048431 Dated Jul. 2, 2013.
PCT International Search Report and Written opinion for International Application No. PCT/US2012/048434 Dated Sep. 28, 2012.
PCT International Search Report and Written opinion for International Application No. PCT/US2012/048435 Dated Sep. 27, 2012.
PCT International Search Report and Written opinion for International Application No. PCT/US2012/048438 Dated Sep. 28, 2012.
PCT International Search Report and Written opinion for International Application No. PCT/US2012/048439 Dated Sep. 27, 2012.
PCT International Search Report and Written opinion for International Application No. PCT/US2012/048442 Dated Sep. 28, 2012.
PCT International Search Report and Written opinion for International Application No. PCT/US2012/048441 Dated Sep. 28, 2012.
PCT International Search Report and Written opinion for International Application No. PCT/US2012/048444 Dated Sep. 27, 2012.
PCT International Search Report and Written opinion for International Application No. PCT/US2012/048484 Dated Sep. 28, 2012.

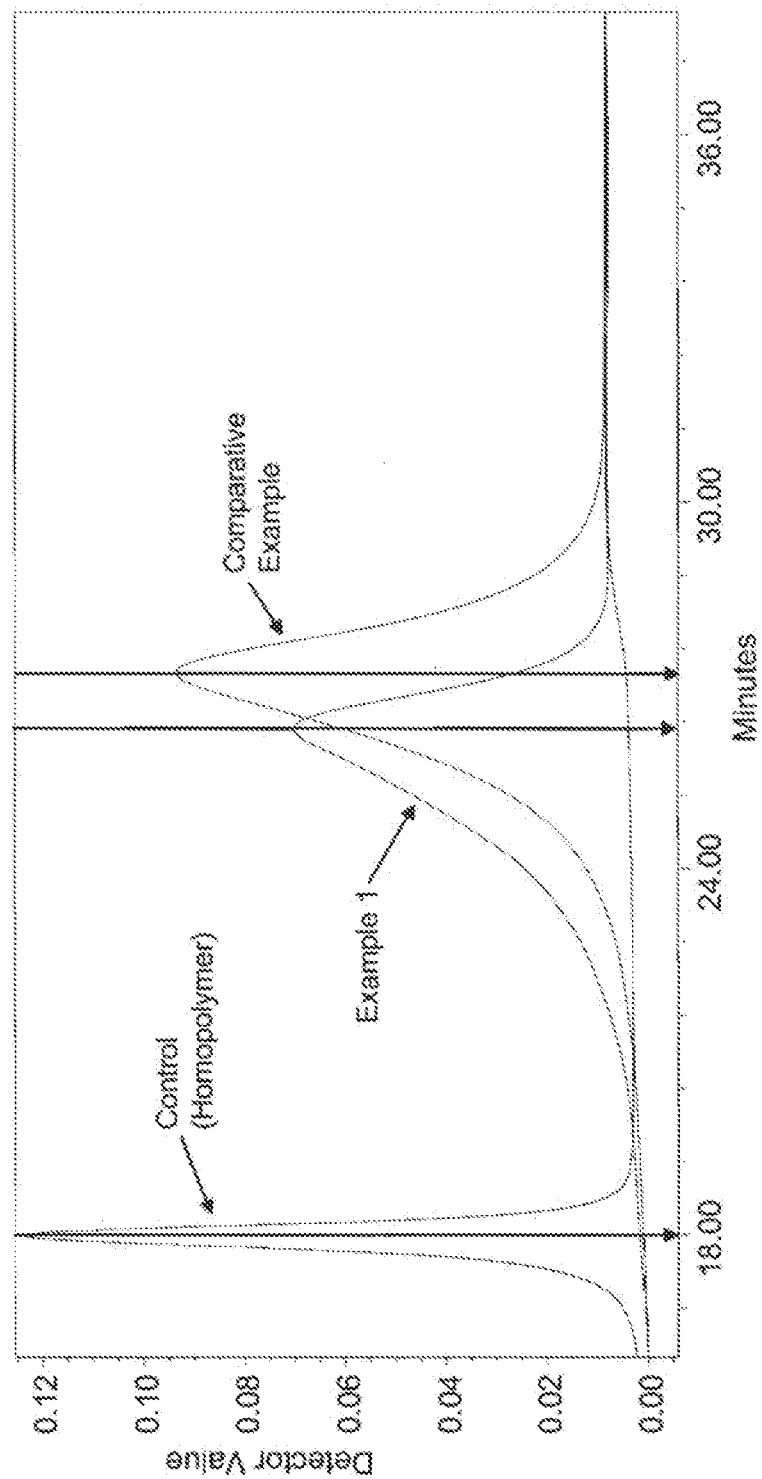

PROCESS OF FORMING AN ARAMID COPOLYMER

TECHNICAL FIELD

The present application concerns methods of producing aramid polymers derived from 5(6)-amino-2-(p-aminophenyl)benzimidazole (DAPBI), para-phenylenediamine dihydrochloride (PPD.2HCl) and terephthaloyl dichloride (TCl) that are capable of forming fibers having superior physical properties.

BACKGROUND

Fibers derived from 5(6)-amino-2-(p-aminophenyl)benzimidazole (DAPBI), para-phenylenediamine (PPD) and terephthaloyl dichloride (TCl or T, also commonly referred to as terephthaloyl chloride) are known in the art. Such copolymers are the basis for a high strength fibers manufactured in Russia, for example, under the trade names Armos® and Rusar®. See, Russian Patent Application No. 2,045,586.

One issue in using DAPBI is that it has very poor solubility in a NMP/CaCl$_2$ solvent system. In order to prepare DAPBI/paraphenylene diamine (PPD) copolymers from copolymer solutions having higher concentrations of polymer in the solvent system (i.e., above 4% weight percent polymer in the solvent system), DAPBI is typically first fully dissolved in the solvent system by heating the combination to a temperature of about 70° C. or higher followed by addition of PPD. PPD dissolves readily in the solvent. The mixture of diamines in solution, however, then has to be cooled to lower temperature (i.e. ~5° C.) before starting polymerization with TCl. DAPBI precipitates back out during this cooling process and polymerization becomes "heterogeneous", with the PPD remaining in solution and the DAPBI in solid state. It is believed the PPD in such a solution preferentially reacts with the TCl upon its addition versus the DAPBI in its un-dissolved state, creating highly heterogeneous block polymers, with blocks of predominantly PPD and then blocks of predominantly DAPBI.

Another issue in using DAPBI is the two amines on DAPBI are very different in reactivity and positional factors. The amine shown to the right in the below structure (the azole amine) is an order of magnitude more reactive than the amine to the left in the structure (the benzyl amine).

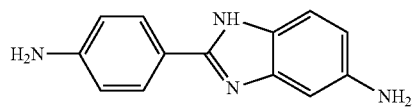

As a result, DAPBI/PPD copolymers prepared by a conventional polymerization process in a NMP/CaCl$_2$ solvent system tend to have no control over the position of the monomer components. It is believed a factor in creating higher strength fibers from DAPBI/PPD copolymer is the arrangement of the comonomers along the polymer chain. In particular, controlling the distribution of PPD and DAPBI comonomers is believed to help prevent the formation of crystal solvates in sulfuric acid solution and help the alignment of polymer chains during the heat treatment of fibers made from the copolymer, resulting in fibers with better mechanical properties.

SUMMARY

In some aspects, the invention concerns processes for forming a polymer comprising residues of 2-(4-amino phenyl)-5 (6) amino phenyl benzimidazole (DAPBI), paraphenylene diamine, and terephthaloyl dichloride, comprising the steps of: (a) forming a solution of DAPBI and paraphenylene diamine dihydrochloride (PPD.2HCl) in a solvent system comprising an organic solvent and an inorganic salt; (b) cooling the solution to a temperature of 30° C. or less; (c) adding a stoichiometric amount of terephthaloyl dichloride, relative to the total amount of the DAPBI and the paraphenylene diamine dihydrochloride, to the solution; and (d) agitating the solution of step c) to form a polymer.

In some embodiments, the organic solvent is N-methyl-2-pyrrolidone (NMP) or dimethylacetamide (DMAC). Suitable inorganic salts include LiCl and CaCl$_2$. In one preferred embodiment, the solvent system is NMP/CaCl$_2$. In certain embodiments, the NMP/CaCl$_2$ solvent has a CaCl$_2$ weight percent in the range of from 1 to 10%.

In some processes, in step a) the solution is formed by heating DAPBI and paraphenylene diamine dihydrochloride in the solvent system. Terephthaloyl dichloride can be added stepwise or in a single step.

The molar ratio of DAPBI to phenylene diamine can be in the range of from 0.25 to 4.0 for some reactions. The amount of the solution that is DAPBI is step (a) is in the range of from 0.3 to 9.0 weight % in certain reactions. The amount of solution that is paraphenylene diamine dichloride in step (a) can be in the range of from 0.2 to 10.0 weight %.

The polymer can be isolated in some embodiments. The polymer can be treated with one or more washing steps, neutralizing steps, or both. In some embodiments, the polymer can be comminuted. The washing and/or neutralizing steps can be performed before or after comminuting the polymer.

In some aspects, the invention additionally concerns the step of dissolving the polymer in a solvent comprising sulfuric acid to form a solution suitable for spinning fibers. The polymer to be dissolved includes the isolated polymer that may or may not have been washed and/or neutralized and polymer may or may not have been comminuted.

In another aspect, the invention concerns polymer comprising residues of 2-(4-amino phenyl)-5 (6) amino phenyl benzimidazole (DAPBI), paraphenylene diamine (or paraphenylene diamine dihydrochloride), and terephthaloyl dichloride, the polymer having a IPC peak block ratio (Relative Elution Time of sample/DAPBI-T homopolymer) of 1.43 to 1.47, preferably 1.44-1.46, and an inherent viscosity of greater than 2 dl/g. In certain embodiments, the polymer has an inherent viscosity of 4 dl/g or greater.

BRIEF DESCRIPTION OF THE DRAWINGS

The foregoing summary, as well as the following detailed description, is further understood when read in conjunction with the appended drawings. For the purpose of illustrating the invention, there is shown in the drawings exemplary embodiments of the invention; however, the invention is not limited to the specific methods, compositions, and devices disclosed. In the drawings:

FIG. 1 presents IPC results from the examples versus that of DAPBI-T homopolymer.

DETAILED DESCRIPTION OF ILLUSTRATIVE EMBODIMENTS

In some aspects, the invention concerns processes for forming a polymer comprising residues of 2-(4-amino phenyl)-5 (6) amino phenyl benzimidazole (DAPBI), paraphenylene diamine, and terephthaloyl dichloride, comprising the steps of: (a) forming a solution of DAPBI and paraphenylene diamine dihydrochloride (PPD.2HCl) in a solvent system comprising an organic solvent and an inorganic salt; (b) cooling the solution to a temperature of 30° C. or less; (c) adding a stoichiometric amount of terephthaloyl dichloride, relative to the total amount of the DAPBI and the paraphenylene diamine dihydrochloride, to the solution; and (d) agitating the solution of step c) to form a polymer.

In the present invention when PPD.2HCl rather than PPD is used in the hot solution of DAPBI in NMP/CaCl$_2$, upon cooling to ~5° C., the dissolved DAPBI did not precipitate with the resultant cooled solution of diamines being a homogeneous solution. When the PPD.2HCl is used rather than the PPD, the color of solution becomes "blue", and while not wanting to be bound by theory, it is believed that this reflects the preferential formation of a hyper-conjugated and delocalized electronic structure of DAPBI by accepting HCl from PPD.2HCl, as shown below. In other words, it is believed that the blue color is the result of the planar DAPBI.HCl.

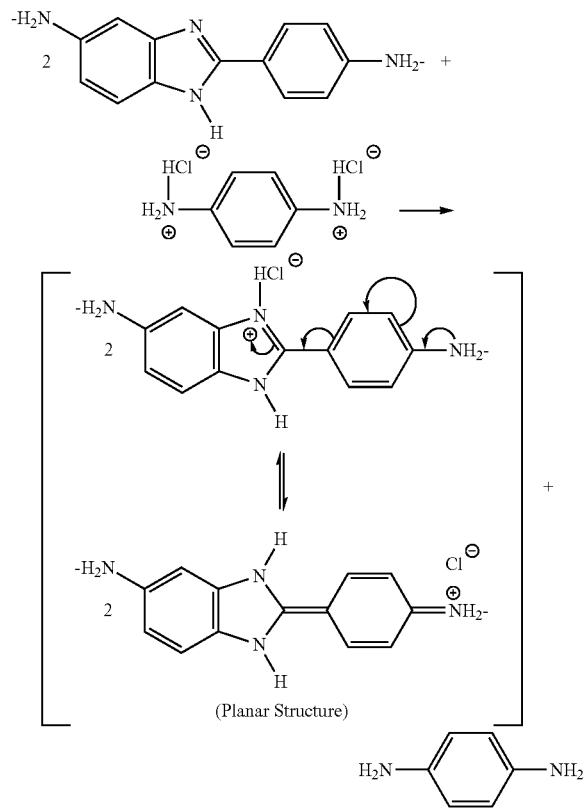

The planar structure restricts the rotation around a single bond in DAPBI and helps to provide higher chain rigidity. This homogeneous solution of DAPBI and PPD is then polymerized with TCl, providing a high inherent polymer.

In some embodiments, the solvent or solvent containing the diamines is cooled, or the reaction mixture is cooled, to the lowest temperature the system can withstand (such as the freezing point of the solvent, etc.) to avoid side reactions between the TCl and the solvent. In some instances, it is useful to cool the solvent or solvent mixture to 10 degrees C. or less, preferably 5 degrees C. or less. Vessels useful for producing polymers, and temperatures and other conditions useful in producing polymers, include, for example, details disclosed in such patents as U.S. Pat. No. 3,063,966 to Kwolek et al.; U.S. Pat. No. 3,600,350 to Kwolek; U.S. Pat. No. 4,018,735 to Nakagawa et al.; and U.S. Pat. No. 5,646,234 to Jung et al.

In some embodiments, the organic solvent is N-methyl-2-pyrrolidone (NMP) or dimethylacetamide (DMAC). Suitable inorganic salts include LiCl and CaCl$_2$. In one preferred embodiment, the solvent system is NMP/CaCl$_2$. In certain embodiments, the NMP/CaCl$_2$ solvent has a CaCl$_2$ weight percent in the range of from 1 to 10%. It should be noted that the solubility of CaCl$_2$ in NMP is about 8%. As such, when more than 8% CaCl$_2$ is used, some undissolved CaCl$_2$ is present in the solvent system. The solvents and salts can be obtained from commercial sources and, if desired, purified by methods known to those skilled in the art.

The amount of the solution that is DAPBI is step (a) is in the range of from 0.3 to 9.0 weight % in certain reactions. The amount of solution that is paraphenylene diamine dichloride in step (a) can be in the range of from 0.2 to 10.0 weight %.

The polymer can be isolated in some embodiments. The isolated polymer can be comminuted a desired particle size to assist in processing and storage. The polymer can be treated with one or more washing steps, neutralizing steps, or both. These washing and/or neutralizing steps can be performed before or after comminuting the polymer. Equipment suitable for use in agitation of the reaction mixtures, washing and neutralization steps, and comminuting the polymer is known to those skilled in the art.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g").

Neutralization of the polymer can occur in one or more steps by contacting the polymer with a base. Suitable bases include NaOH; KOH; Na$_2$CO$_3$; NaHCO$_3$; NH$_4$OH; Ca(OH)$_2$; K$_2$CO$_3$; KHCO$_3$; or trialkylamines, preferably tributylamine; other amines; or mixtures thereof. In one embodiment, the base is water soluble. In some preferred examples the neutralization solution is an aqueous solution of base.

The polymer can also be washed with water independent of or prior to and/or after the neutralization step.

In some aspects, the invention additionally concerns the step of dissolving the polymer in a solvent comprising sulfuric acid to form a solution suitable for spinning fibers (also referred to as a "spin dope"). The polymer to be dissolved includes the isolated polymer that may or may not have been washed and/or neutralized and polymer may or may not have been comminuted. While any suitable solvent can be used to dissolve the polymer, in some embodiments the solvent comprises N-methyl-2-pyrrolidone (NMP) or dimethylacetamide (DMAC) and an inorganic salt to form a solution suitable for spinning fibers. The dissolved polymer can be spun into fibers by conventional techniques known to those skilled in the art.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air and is a preferred method for forming filaments As used herein, the terms filaments and fibers are used interchangeably.

The fiber(s) can be contacted with one or more washing baths or cabinets. Washes can be accomplished by immersing the fiber into a bath or by spraying the fiber with the aqueous solution. Washing cabinets typically comprise an enclosed cabinet containing one or more rolls that the yarn travels around a number of times, and across, prior to exiting the cabinet. As the yarn travels around the roll it is sprayed with at least one washing fluid. The washing fluid is continuously collected in the bottom of the cabinet and drained therefrom.

The temperature of the washing fluid(s) is preferably greater than 30° C. The washing fluid can also be applied in vapor form (steam), but is more conveniently used in liquid form. Preferably, a number of washing baths or cabinets are used. The residence time of the yarn in any one washing bath or cabinet will depend on the desired amount of residual sulfuric acid left in the yarn. In a continuous process, the duration of the entire washing process in the preferred multiple washing bath(s) and/or cabinet(s) is preferably no greater than about 10 minutes, more preferably greater than about 5 seconds. In some embodiments the duration of the entire washing process is 20 seconds or more; in some embodiments the entire washing is accomplished in 400 seconds or less. In a batch process, the duration of the entire washing process can be on the order of hours, as much as 12 to 24 hours or more.

If needed, neutralization of the acid (such as sulfuric acid solvent) in the yarn can occur in a bath or cabinet. In some embodiments, the neutralization bath or cabinet can follow one or more washing baths or cabinets. Washes can be accomplished by immersing the fiber into a bath or by spraying the fiber with the aqueous solution. Neutralization can occur in one bath or cabinet or in multiple baths or cabinets. In some embodiments, preferred bases for the neutralization of sulfuric acid impurity include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution containing 0.01 to 1.25 mols of base per liter, preferably 0.01 to 0.5 mols of base per liter. The amount of cation is also dependent on the time and temperature of exposure to the base and the washing method. In some preferred embodiments, the base is NaOH or $Ca(OH)_2$.

After treating the fiber with base, the process optionally can include the step of contacting the yarn with a washing solution containing water or an acid to remove all or substantially all excess base. This washing solution can be applied in one or more washing baths or cabinets.

After washing and neutralization, the fiber or yarn can be dried in a dryer to remove water and other liquids. One or more dryers can be used. In certain embodiments, the dryer can be an oven that uses heated air to dry the fibers. In other embodiments, heated rolls can be used to heat the fibers. The fiber is heated in the dryer to a temperature of at least about 20° C. but less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. The inventors have discovered that low temperature drying is a preferred route to improved fiber strength. Specifically, the inventors have found that the best fiber strength properties are achieved when the first drying step (i.e. heated roll, heated atmosphere as in an oven, etc.) experienced by the never-dried yarn is conducted at gentle temperatures not normally used in continuous processes used to dry high strength fibers on commercial scale. It is believed that the copolymer fiber has more affinity to water than PPD-T homopolymer; this affinity slows the diffusion rate of water out of the polymer during drying and consequently if the never-dried yarn is directly exposed to typical high drying temperatures, generally used to create a large thermal driving force and reduce drying time, irreparable damage to the fiber occurs resulting in lower fiber strength. In some embodiments, the fiber is heated in this first drying step to at least to about 30° C.; in some embodiments the fiber is heated in this first drying step at least to about 40° C.

The dryer residence time is less than ten minutes and is preferably less than 180 seconds. The dryer can be provided with a nitrogen or other non-reactive atmosphere. The drying step typically is performed at atmospheric pressure; however, if desired, the step can be performed under reduced pressure. In one embodiment, the filaments are dried under a tension of at least 0.1 gpd, preferably a tension of 2 gpd or greater.

The invention also concerns a polymer powder comprising residues of 2-(4-amino phenyl)-5 (6) amino phenyl benzimidazole (DAPBI), paraphenylene diamine (PPD) (or paraphenylene diamine dihydrochloride (PPD.2HCl)), and terephthaloyl dichloride, capable of being dissolved in N-methyl-2-pyrrolidone (NMP) or dimethylacetamide (DMAC) and an inorganic salt. It should be noted that polymers made by traditional processes, once isolated, do not have the capability of being redissolved in a solvent system of NMP or DMAc and an inorganic salt but require a solvent such as sulfuric acid to achieve a spinning solution. In some embodiments, the polymer powder has an inherent viscosity of greater than 2 dl/g. In some preferred embodiments, the polymer has an inherent viscosity of 4 dl/g or greater.

In some embodiments, the polymer is characterized by having a IPC peak block ratio (Relative Elution Time of sample/DAPBI-T homopolymer) of 1.43 to 1.47, preferably 1.44-1.46, when run under the conditions discussed in the description of the IPC test detailed below.

Definitions

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine (or paraphenylene diamine dihydrochloride) refers to a copolymer having one or more units of the formula:

Similarly, a copolymer comprising residues of DAPBI contains one or more units of the structure:

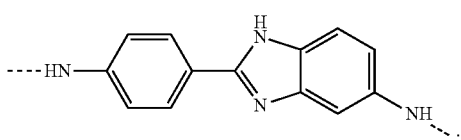

A copolymer having residues of terephthaloyl dichloride contains one or more units of the formula:

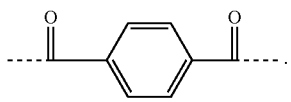

Dashed lines indicate bond positions.

The term "polymer," as used herein, means a polymeric compound prepared by polymerizing monomers, whether of the same or a different type. The term "copolymer" (which refers to polymers prepared from two different monomers), the term "terpolymer" (which refers to polymers prepared from three different types of monomers), and the term "quadpolymer (which refers to polymers having four different types of monomers) are included in the definition of polymer.

The term "powder" when referring to polymer means particles of the copolymer having neither fibrous qualities like fiber or pulp, nor fibrous film-like qualities like fibrids. Individual particles tend to be fibril-free, have a random shape, and an effective particle diameter of 840 micrometers or less. U.S. Pat. Nos. 5,474,842 & 5,811,042 are illustrative.

As used herein, "stoichiometric amount" means the amount of a component theoretically needed to react with all of the reactive groups of a second component. For example, "stoichiometric amount" refers to the moles of terephthalic didchloride needed to react with substantially all of the amine groups of the amine component (paraphenylene diamine dihydrochloride and DAPBI). It is understood by those skilled in the art that the term "stoichiometric amount" refers to a range of amounts that are typically within 10% of the theoretical amount. For example, the stoichiometric amount of terephthalic dichloride used in a polymerization reaction can be 90-110% of the amount of terephthalic acid theoretically needed to react with all of the paraphenylene diamine and DPABI amine groups.

The "fiber" refers to a relatively flexible, macroscopically homogeneous body having a high ratio of length to width across its cross-sectional area perpendicular to its length. In preferred embodiments, the fiber is upon inspection essentially solid in cross-section, having few random voids or open areas that would be considered defects in the fibers.

The term "organic solvent" is understood herein to include a single component organic solvent or a mixture of two or more organic solvents. In some embodiments, the organic solvent is dimethylformaaide, dimethylacetamide (DMAC), N-methyl-2-pyrrolidone (NMP), or dimethylsulfoxide. In some preferred embodiments, the organic solvent is N-methyl-2-pyrrolidone or dimethylacetamide.

The term "inorganic salt" refers to a single inorganic salt or to a mixture of two or more inorganic salts. In some embodiments, the inorganic salt is sufficiently soluble in the solvent and liberates an ion of a halogen atom having an atomic number in the solvent. In some embodiments, the preferred inorganic salt is KCl, $ZnCl_2$, LiCl or $CaCl_2$. In certain preferred embodiments, the inorganic salt is LiCl or $CaCl_2$.

By "never-dried" it is meant the moisture content of the fiber is at least 75 weight percent of the fiber.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

Test Methods

Inherent viscosity can be determined using a solution in which a polymer is dissolved in a concentrated sulfuric acid with a concentration of 96 wt % at a polymer concentration (C) of 0.5 g/dl and at a temperature of 25° C. Inherent viscosity is then calculated as $\ln(t_{poly}/t_{solv})/C$ where $t_{poly}$ is the drop time for the polymer solution and $t_{solv}$ is the drop time of the pure solvent.

Interaction Polymer Chromatography (IPC) method was used to analyze the microstructure of p-aramid copolymers. The chromatographic separations were performed on Alliance 2695™ Separation Module with column heater at 60° C. from Waters Technologies (Milford, Mass., USA). The module provides a low-pressure quaternary gradient pumping system with lag volume 0.6 ml to the column outlet, online solvent degassing and automatic sample injection from 2-ml vials. Waters UV/Vis 487™ photometer at 320 nm wavelength was used as an online detector. Two components of a mobile phase used were water (component A) and N,N'-dimethylformamide (DMAc) with 4% lithium chloride (LiCl) (component B). 20 minutes linear gradient from 70% B to 100% B at flow rate 0.5 ml/min was used for separation. Silica NovaPak™ 150×3.9 mm with 60 A pore size from Waters was used as a stationary phase. Each sample was dissolved in DMAc with 4% LiCl at 120° C. with moderate agitation for 12 hours at concentration 0.2 mg/ml, and injected using 10 ml injection loop.

Empower™ version 2 software module from Waters was used for data acquisition and reduction. The IPC peak block ratio is then determined by running a data set including a control of DAPBI-T homopolymer and the copolymer to be evaluated. The Figure is an typical illustration of the peaks for the homopolymer and copolymers being evaluated, with the vertical arrows indicating the peak values. The IPC peak block ratio is then calculated by the following formula:

IPC peak block ratio=Minutes to peak for copolymer/
Minutes to peak for homopolymer.

The invention is illustrated by the following examples, which are not intended to be limiting in nature.

EXAMPLES

NMP, DMAC, LiCl, $CaCl_2$, DAPBI, PPD and TCl were obtained from commercial sources.

Example 1

To 1 liter reaction kettle equipped with basket stirrer, nitrogen inlet/outlet, 83.71 grams of NMP/$CaCl_2$ premix (8.3 wt % (weight of salt/total weight of salt plus solvent)), 161.65 grams of NMP (N-methyl-2-pyrrolidone), 12.282 grams (0.055 moles) of DAPBI (5(6)-amino-2-(p-aminophenyl) benzimidazole), 4.250 grams (0.023 mole) of PPD.2HCl (p-phenylenediamine dihydrochloride) were added and stirred at room temperature. Unlike the case of PPD addition, all of the solid materials were completely dissolved within 30 minutes of stirring at room temperature. The clear solution showed light bluish color. The reaction mixture was cooled to below 10° C. by stirring in a ice-water bath. At this point, 5.560 grams (0.027 moles) of TCl was added all at once and stirred for 5 minutes under nitrogen. Ice-water bath was removed and 10.325 grams of $2^{nd}$ TCl was added all at once and stirred slowly for 30 seconds and then the stirrer speed was increased to the maximum. The solution became very viscous, gelled and finally became a rubbery mass. The rubbery mass hardened with time and broke into small chunks of irregular sizes. The mixture was stirred for 30 more minutes. The resulting polymer was transferred to Waring® Blender and was ground to small particles and washed several times to remove solvent (NMP/$CaCl_2$) and HCl generated from both PPD.2HCl and the polymerization reaction. Then the polymer was neutralized with sodium bicarbonate and finally washed with water a few times to get neutral polymer. The polymer was transferred into a tray and dried at 120° C. over night in a vacuum oven with nitrogen sweep. The polymer inherent viscosity was 7.36 dl/g as measured by dissolving in sulfuric acid and measuring per the test method.

Comparison Example

This example illustrates the preparation of DAPBI/PPD-T copolymer in NMP/$CaCl_2$ solvent by the conventional way of adding TCl to the solution of both DAPBI and PPD in the solvent.

83.71 grams of NMP/$CaCl_2$ premix (8.3 wt % (weight of salt/total weight of salt plus solvent)), 163.32 grams of NMP, and 2.538 grams [0.023 moles] of PPD were added to a 1-liter reaction kettle equipped with a basket stirrer and a nitrogen inlet/outlet. The mixture was stirred at room temperature until all PPD is dissolved completely in the solvent. Then 12.282 grams (0.055 moles) of DAPBI was added and stirred for 15 more minutes at room temperature. Unlike the Example above, the solution looked milky due to undissolved DAPBI. The solution was the mixture of completely dissolved PPD and partially dissolved DAPBI, a heterogeneous system. The mixture was cooled to below 10° C. by placing in ice water bath and stirred for 15 minutes. 5.573 grams (0.027 moles) of TCl was added and stirred for 5 minutes. The ice-water bath was removed and 10.351 grams of a second portion of TCl was added all at once and stirred. The solution became very viscous and gelled within 4 minutes and the stirring continued for another 25 minutes. Highly viscous lumps of polymer were transferred to a Waring® blender and were ground to small particles and washed several times to remove solvent (NMP/$CaCl_2$) and excess HCl generated by the reaction. Then the polymer was neutralized with sodium bicarbonate and finally washed with water a few times to get neutral polymer. The polymer was transferred into a tray and dried at 120° C. overnight in a vacuum oven with nitrogen sweep. The polymer inherent viscosity was 5.47 dl/g as measured by dissolving is sulfuric acid and measuring per the test method. Determination of IPC Values IPC peak block ratios were determined for the polymer of Example 1 and the Comparison Example by the test method described above. Results are presented below.

|  | Peak Value | Peak Ratio |
| --- | --- | --- |
| Homopolymer (Control) | 18.00 min | NA |
| Example 1 | 26.29 min | 1.46 |
| Comparison | 27.16 min | 1.50 |

What is claimed:

1. A process for forming a polymer comprising residues of 2-(4-amino phenyl)-5 (6) amino benzimidazole (DAPBI), paraphenylene diamine, and terephthaloyl dichloride, comprising the steps of:
    a) forming a solution of DAPBI and paraphenylene diamine dihydrochloride in a solvent system comprising an organic solvent and an inorganic salt;
    b) cooling the solution to a temperature of 30° C. or less;
    c) adding a stoichiometric amount of terephthaloyl dichloride, relative to the total amount of said DAPBI and said paraphenylene diamine dihydrochloride, to the solution; and
    d) agitating the solution of step c) to form a polymer.

2. The process of claim 1, wherein the organic solvent is N-methyl-2-pyrrolidone (NMP) or dimethylacetamide (DMAC).

3. The process of claim 1, wherein the inorganic salt is LiCl or $CaCl_2$.

4. The process of claim 1, wherein the solvent system is NMP/$CaCl_2$.

5. The process of claim 1, further comprising isolating said polymer from said solvent system.

6. The process of claim 1, wherein step a) said solution is formed by heating DAPBI and paraphenylene diamine dihydrochloride in said solvent system.

7. The process of claim 1, wherein terephthaloyl dichloride is added stepwise.

8. The process of claim 1, wherein terephthaloyl dichloride is added in a single step.

9. The process of claim 5, further comprising the step of comminuting the polymer.

10. The process of claim 5, further comprising treating the polymer with one or more washing steps, neutralizing steps, or both.

11. The process of claim 9, further comprising treating the polymer with one or more washing steps, neutralizing steps, or both.

12. The process of claim 10, further comprising the step of dissolving the polymer in a solvent comprising sulfuric acid to form a solution suitable for spinning fibers.

13. The process of claim 11, further comprising the step of dissolving the polymer in a solvent comprising sulfuric acid to form a solution suitable for spinning fibers.

14. The process of claim 1, wherein DAPBI and phenylene diamine are present in a molar ratio in the range of from 0.25 to 4.

15. The process of claim 4, wherein NMP/$CaCl_2$ has a $CaCl_2$ weight percent in the range of from 1 to 10%.

16. The process of claim 1, wherein the amount of DAPBI used in forming the solution in step (a) is in the range of from 0.3 to 9.0 weight %.

17. The process of claim 1, wherein the amount of paraphenylene diamine dichloride used in forming the solution in step (a) is in the range of from 0.2 to 10.0 weight %.

18. The process of claim 1, wherein the solution is cooled to a temperature of 10° C. or less.

* * * * *